United States Patent [19]

McKinney et al.

[11] E Re. 28,906

[45] Reissued July 20, 1976

[54] CRIMPING APPARATUS WITH HEATING AND COOLING CAGE

[75] Inventors: Donald W. McKinney, Wilmington, Del.; Henry A. Sinski, Aldan, Pa.

[73] Assignee: Indian Head Inc., New York, N.Y.

[22] Filed: June 6, 1975

[21] Appl. No.: 584,288

Related U.S. Patent Documents

Reissue of:

[64] Patent No.: 3,587,145
Issued: June 28, 1971
Appl. No.: 834,792
Filed: June 19, 1969

[52] U.S. Cl. ..... 28/1.7; 28/72.14
[51] Int. Cl.[2] ..... D02G 1/12
[58] Field of Search ..... 28/1.6, 1.7, 72.14

[56] References Cited

UNITED STATES PATENTS

| | | | |
|---|---|---|---|
| 2,854,729 | 10/1958 | Russo et al. | 28/1.6 |
| 3,303,546 | 2/1967 | Van Blerk | 28/72.14 X |
| 3,337,930 | 8/1967 | Aelion et al. | 28/1.4 |

*Primary Examiner*—Louis K. Rimrodt

[57] ABSTRACT

A stuffer crimper having a closed housing forming a heating chamber and a set of spaced rods supporting the core of crimped yarn and holding the core spaced from the walls of the housing. Choke members engage the sides of said core near the inlet end of said heating chamber to control the back pressure of the core. Steam under low pressure is introduced into the chamber between the walls and the core and is caused to permeate the core and act as a heat transfer agent to facilitate the setting of the crimp.

28 Claims, 14 Drawing Figures

INVENTORS
DONALD W. McKINNEY
HENRY A. SINSKI

BY

ATTORNEY

INVENTORS
DONALD W. Mc KINNEY
HENRY A. SINSKI

INVENTORS
DONALD W. McKINNEY
HENRY A. SINSKI

INVENTORS
DONALD W. McKINNEY
HENRY A. SINSKI

INVENTORS
DONALD W. McKINNEY
HENRY A. SINSKI

INVENTORS
DONALD W. McKINNEY
HENRY A. SINSKI

INVENTORS
DONALD W McKINNEY
HENRY A. SINSKI

CRIMPING APPARATUS WITH HEATING AND COOLING CAGE

Matter enclosed in heavy brackets [ ] appears in the original patent but forms no part of this reissue specification; matter printed in italics indicates the additions made by reissue.

*This application is a reissue of Ser. No. 834,792 filed June 19, 1969, now U.S. Pat. No. 3,587,145, granted June 28, 1971.*

This invention relates to stuffer crimpers of the type wherein a yarn is fed between feed rolls into one end of a crimping chamber to form a core of crimped yarn which is advanced along the chamber by the pressure exerted by the incoming yarn.

An object of the invention is to provide a heating chamber having a minimum of wall friction so that the advance of the core is relatively unimpeded.

Another object is to provide controllable means to regulate the back pressure on the core in the crimping chamber and in the heating chamber.

A further object is to provide a stuffer crimper of the above type which is particularly suited for crimping yarn of large size such as carpet size yarn.

A more general object is to provide a stuffer crimper having novel and improved characteristics.

In a preferred embodiment the crimper includes a confined crimping chamber into which the yarn is fed for crimping by a pair of feed rolls. A closed heating chamber receives the core of crimped yarn from the crimping chamber. This heating chamber includes heated side and end walls and a series of spaced rods disposed within and spaced from such walls with their inner peripheries defining the area of the heating chamber along which the core of crimped yarn is advanced. Since the core contacts only the inner edges of the confining rods, the area of contact is reduced to a minimum so that the friction between the core and the walls is kept at a low value compared to a chamber having walls which contact the core over its entire area. In addition yarn deposits which would ordinarily form on the core contacting surfaces of a stuffer crimping chamber are diverted to the areas between the rods and the core contacting surfaces of the rods remain comparatively clean thereby avoiding the necessity for frequent cleaning of the chamber.

In order to control the back pressure on the core in the crimping zone, a pair of choke members are disposed in the crimping or heating chamber and are yieldably biased toward the sides of the core of crimped yarn so as to engage and compact the core therebetween. The compacting force exerted by the choke members on the core determines the back pressure in the crimping zone, which is an important factor in determining the crimp characteristics.

A further feature is a cooling cage which forms a continuation of the heating chamber and provides a zone wherein the fibers are cooled below the setting temperature. This cooling cage may also include a pair of choke members biased to engage the sides of the core within the cooling zone and determine the back pressure in the heating and cooling zones.

A core sensing device senses the end of the core near the exit end of the chamber and controls the rate of feed or of withdrawal so as to maintain a predetermined quantity of yarn in the chamber. In one embodiment, means is also provided to supply steam at a low temperature and pressure such as the temperature from 212 to 300°F. to the core within the heating chamber. The steam is then superheated to 300°–450°F. so as to eliminate the possibility of condensation and, also, for heating the fibers to a temperature suited to relieve the stress due to crimping, and to effect a permanent set to the crimp when the fibers are again cool. The temperature selected will, of course, depend upon the characteristics of the particular fibers being treated.

The nature of the invention will be better understood from the following description, taken in connection with the accompanying drawings in which a specific embodiment has been shown for purpose of illustration.

Figure 1:
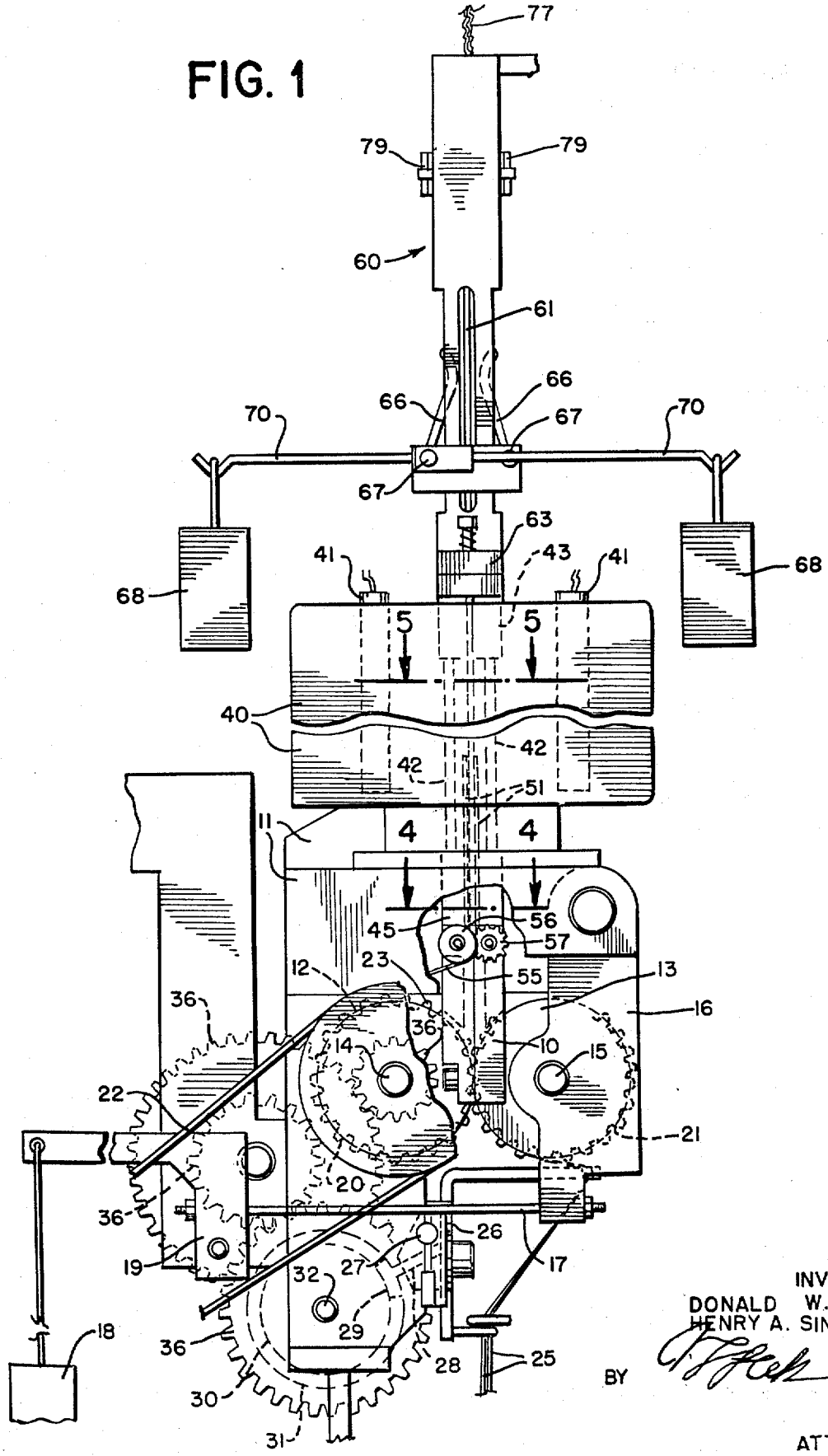
FIG. 1 is an end elevation with portions broken away of a stuffer crimper embodying the invention.
Figure 2:
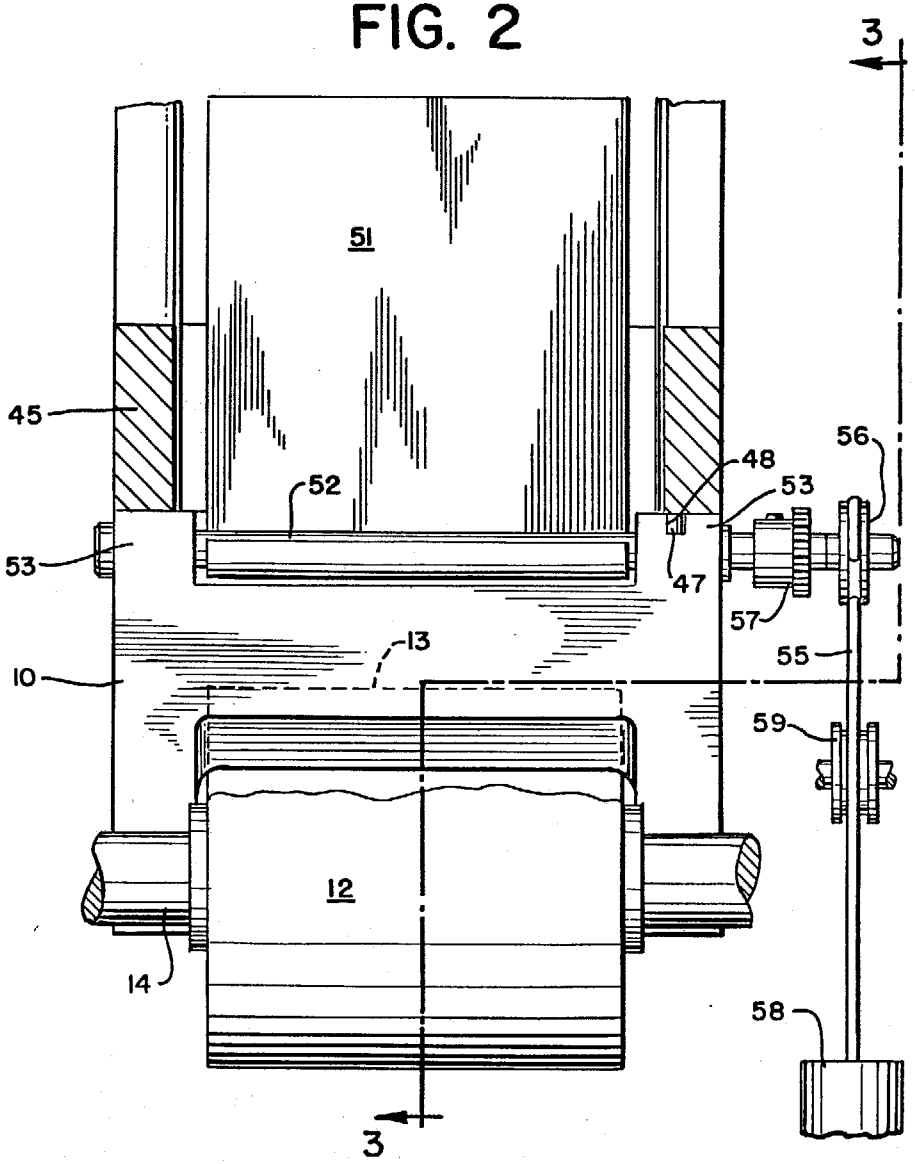
FIG. 2 is a partial front elevation of the crimping apparatus on a larger scale than FIG. 1.
Figure 3:
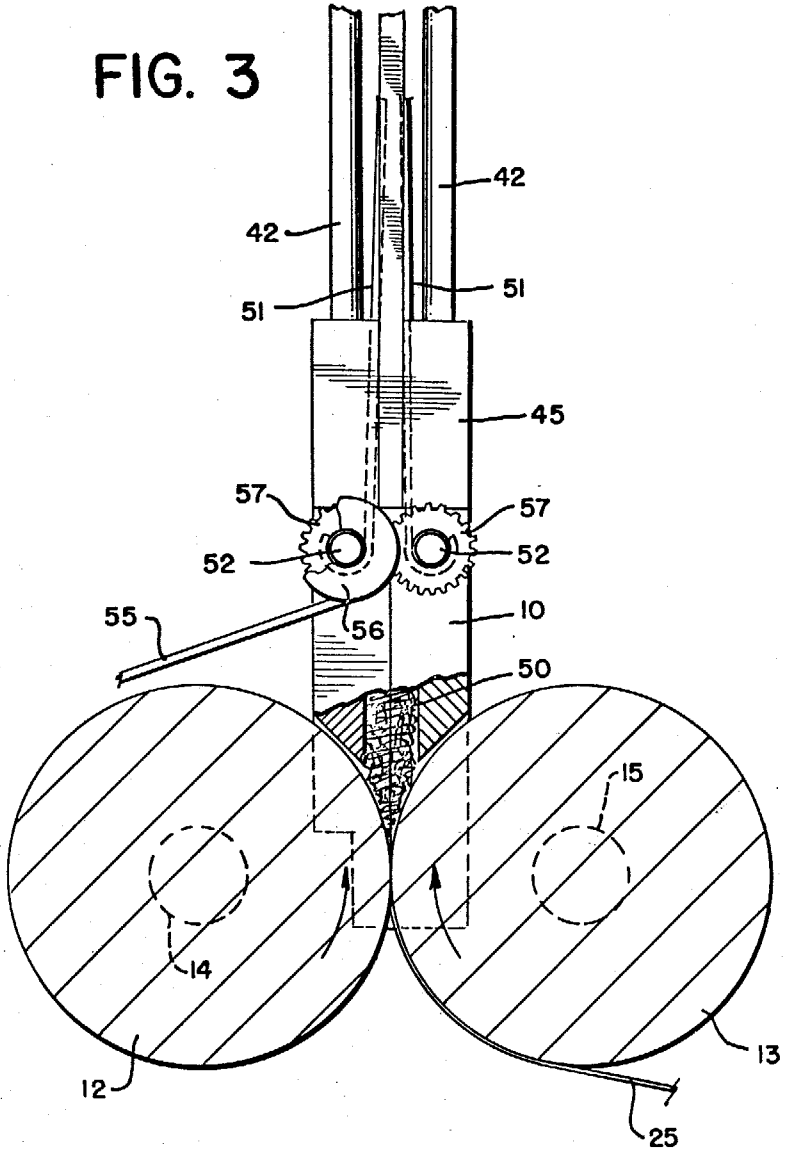
FIG. 3 is an enlarged elevation, partly in section, taken along the line 3—3 of FIG. 2.
Figure 4:
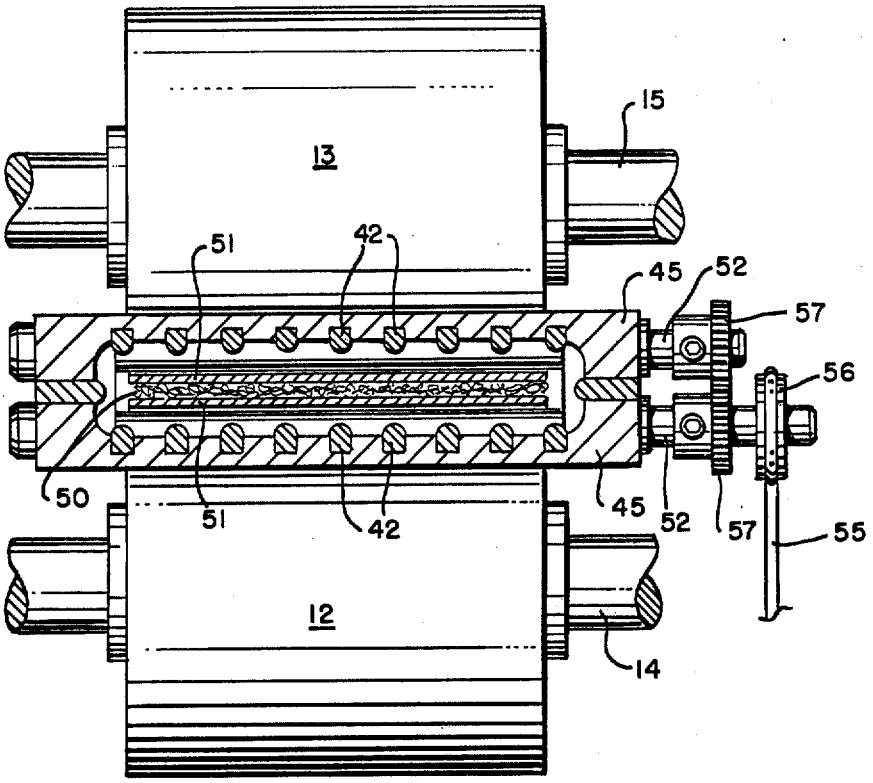
FIG. 4 is a transverse section taken along the line 4—4 of FIG. 1.
Figure 5:
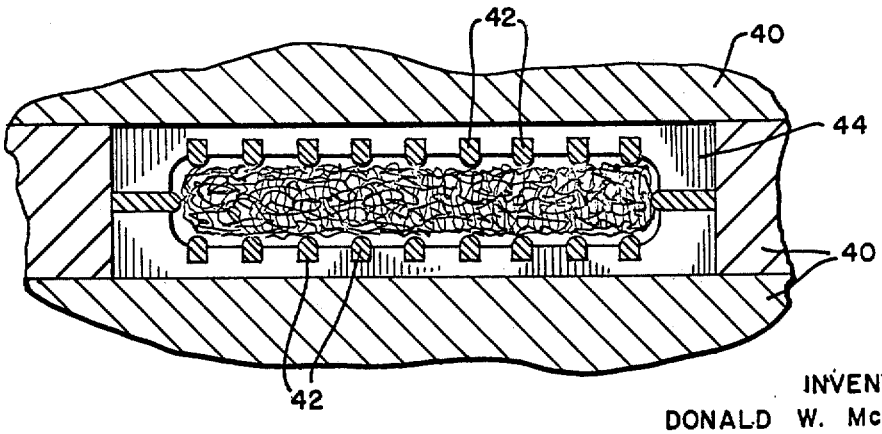
FIG. 5 is a transverse section taken on the line 5—5 of FIG. 1.
Figure 6:
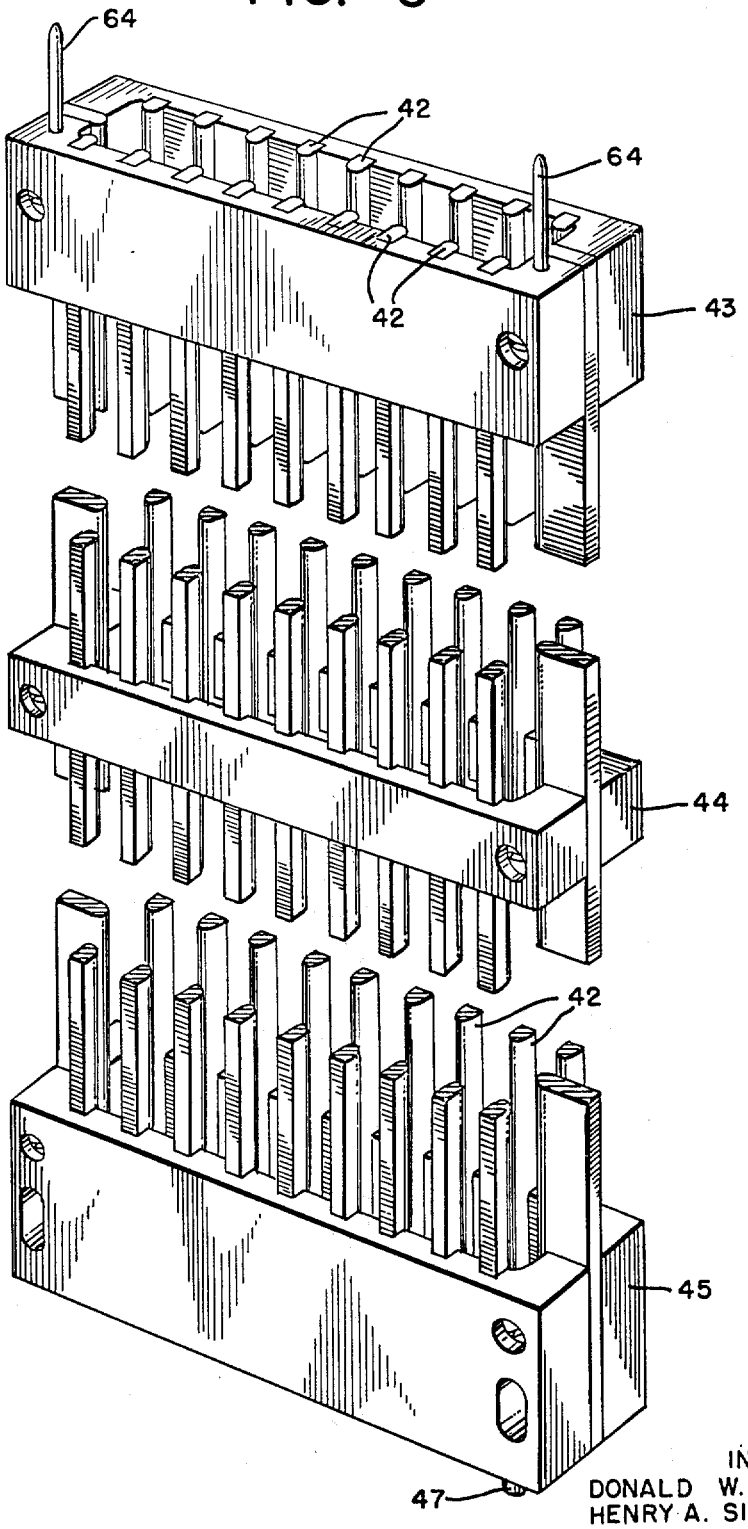
FIG. 6 is a perspective view of the low friction chamber.
Figure 7:
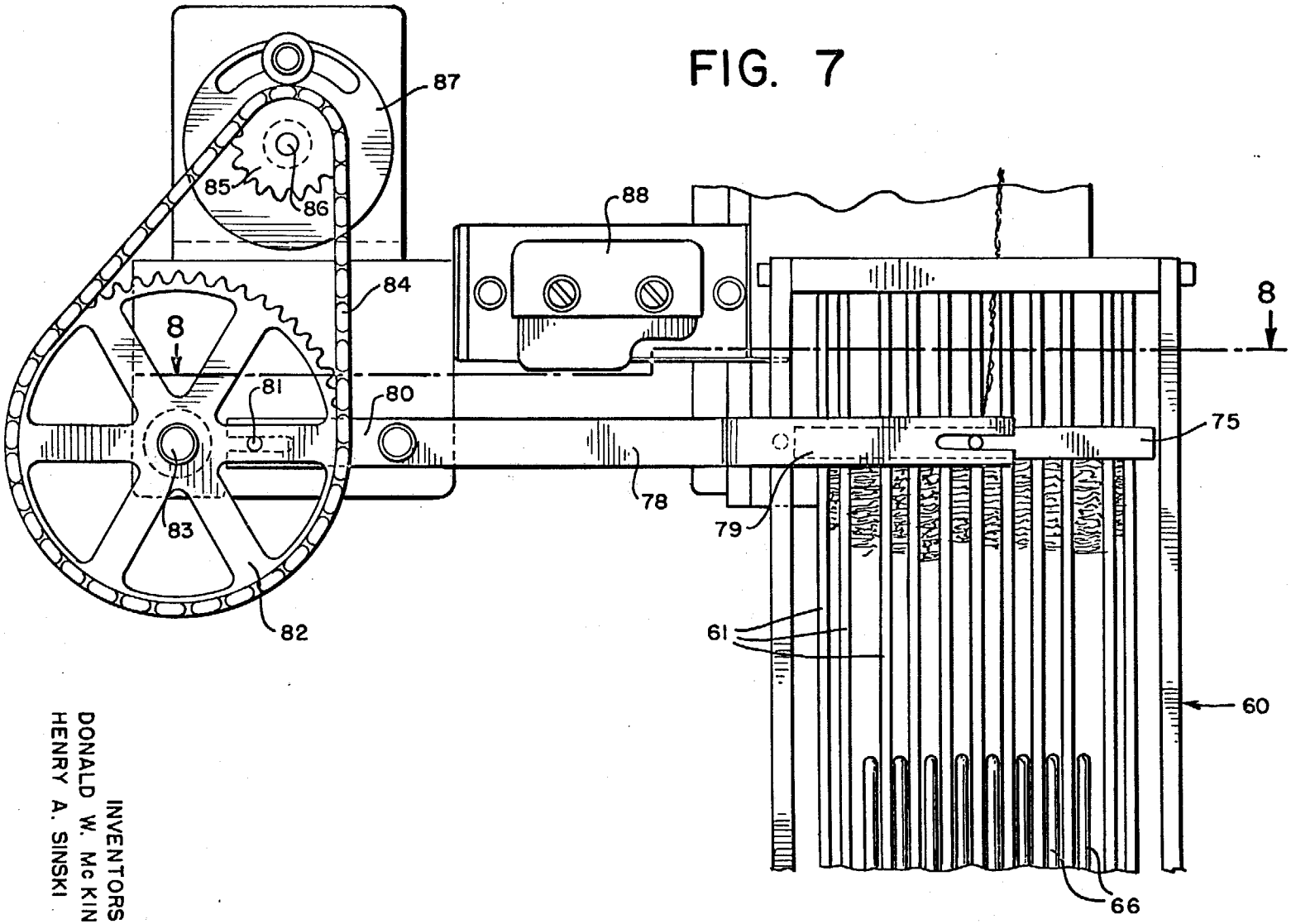
FIG. 7 is a front elevation of the discharge end of the stuffer crimper.
Figure 8:
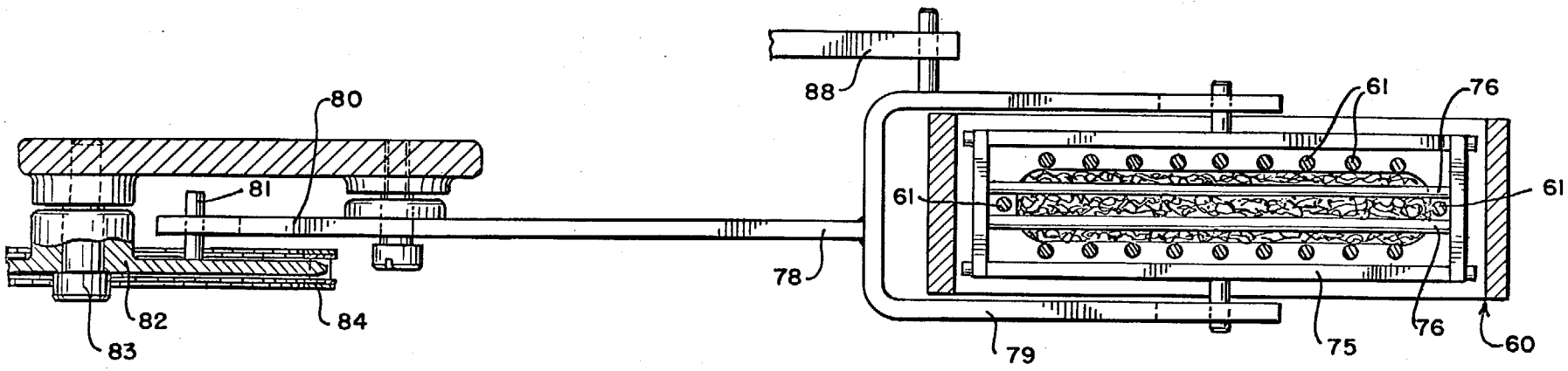
FIG. 8 is a transverse section taken along the line 8—8 of FIG. 7.
Figure 12:
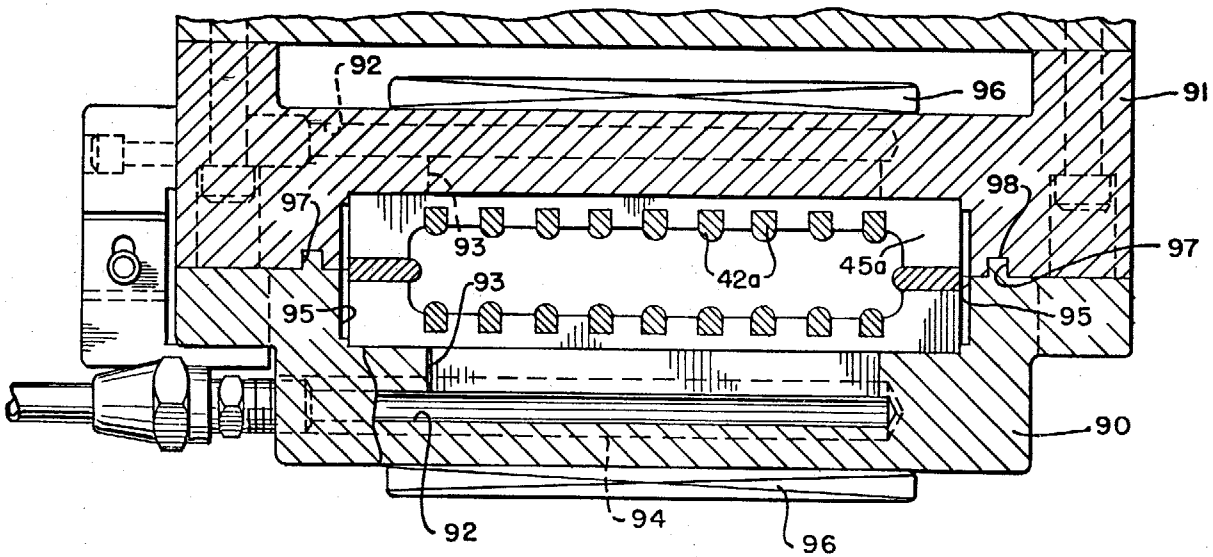
FIG. 12 is a transverse section taken along the line 12—12 of FIG. 11.

Referring to FIGS. 1–8 more in detail, the invention is shown as embodied in a stuffer crimper having a split, rectangular crimping chamber 10 mounted in a support bracket 11 and shaped at its lower end to form a nosepiece conforming to the bite of a pair of feed rolls 12 and 13. The feed roll 12 is carried on a shaft 14 journaled in the bracket 11. The roll 13 is carried on a shaft 15 journaled in a bracket 16 which is pivoted to the bracket 11 and is biased into feeding engagement with the roll 12 by a rod 17 and a weight 18 interconnected through a pivoted bellcrank lever 19. The shafts 14 and 15 are interconnected for driving in unison by spur gears 20 and 21. The shaft 14 is driven from a suitable source of power as by a belt 22 and a belt pulley 23.

Yarn 25 is fed to the bite of the feed rolls 12 and 13 through a traverse guide 26 sliding on rods 27 and having an arm 28 carrying a cam follower 29 riding in a closed helical groove 30 in a traverse roll 31.

The traverse guide 26 is offset from the bite of the feed rolls 12 and 13 so as to cause the yarn to lie on the surface of the feed roll 13 for a substantial distance as it is advanced to the bite. The grip of the feed roll on the yarn which is fed around a predetermined portion of its surface, for example, at least around an arc of 45°, serves to improve the feed and to relieve the strain which would otherwise be produced at the bite and which tends to cause breakage of the yarn, particularly when the yarn is rapidly traversed. The roll 31 is mounted on a shaft 32 and is driven from the shaft 14 through a set of reducing gears 36. The arrangement is such that the yarn is traversed along the bite of the feed rolls 12 and 13 as it is fed into the crimping chamber so as to provide a more uniform distribution of the yarn in the chamber.

A heating chamber comprising a block 40 is mounted on the bracket 11 above the crimping chamber 10. The block 40 carries heating rods 41 for maintaining the wall thereof at the desired temperature. A set of vertical rods 42 disposed in a rectangle and secured in upper, center and lower rectangular collars 43, 44 and 45 have curved inner surfaces disposed in alignment with the inner surface of the crimping chamber 10 to form a continuation thereof. The collars 43, 44 ad 45 fit within the walls of the block 40 and hold the rods 42 spaced therefrom. The lower collar 45 is centered with the chamber 10 by pin 47 carried by the collar 45 and entering a slot 48 in the wall of the chamber 10.

The arrangement is such that the core 50 of crimped yarn in the chamber 10 passes upwardly along the rods 42 and is supported thereby as it advances through the heating chamber.

A pair of choke plates 51 of flexible metal are mounted on shafts 52 which are journaled in upstanding ears 53 on the walls of the chamber 10 with their axes parallel to the axes of the feed rolls 12 and 13. The plates 51 extend upwardly into the cage formed by the rods 42 in the heating zone and are yieldably biased toward the sides of the core 50 by a cord 55 carrying a weight 58. The cord 55 is fixed to a pulley 56 carried by one of the shafts 52. The cord 55 passes around a guide roller 59 and is attached to weight 58. Spur gears 57 cause the shafts 52 to turn in unison and maintain the plates 51 centered with the core 50.

The plates 51 constitute choke members to compact the core which passes therebetween and impede the advance of the core so as to produce a back pressure at the bite of the feed rolls 12 and 13 which can be controlled by the weight 58.

A cooling cage 60 is formed by a set of rods 61 which are held in upper and lower collars 62 and 63. The rods 61 register with the rods 42 and form a continuation thereof. The collar 43 carries positioning pins 64 entering holes in the collar 63 for holding the cooling cage in registration with the cage formed by the rods 42 in the heating chamber. The rods 61 and the collars 62 and 63 are similar in shape to the rods 42 and the collars 43 to 45.

A second choke member is shown as positioned in the cooling cage 60. This latter choke member comprises sets of fingers 66 carried on pins 67 journaled in a support bracket 67 and yieldably biased toward the core 50 by weights 68 attached to the ends of rods 70 which are fixed to the pins 67.

The choke fingers 66 maintain the core under a predetermined pressure in the zone between the two sets of choke members. This pressure is controlled by suitable selection of the weight 68.

The position and the pressure of the two choke members is selected in accordance with the requirements of the particular yarn being processed. The back pressure produced by the first choke member affects the leg length or crimp amplitude and the pressure exerted by the second choke member affects the density of the core in the setting chamber which, in turn, affects the crimp angle which is set into the yarn. The location of the first choke member near the bite of the feed rolls in the crimping chamber makes it unnecessary to maintain a relatively high pressure on the core by the second choke member which would tend to cause the core of yarn to snake or otherwise distort and become jammed against or between the rods in the chamber thereby creating a nonuniform advancing of the core through the setting chamber and in some cases an actual stoppage completely of the advance thereof. In many instances, the second choke members may be omitted depending upon the desired characteristics of the crimp. The spacing of the outer surfaces of the rods 42 from the walls of the heating chamber permits circulation of heated air within the chamber and provides a more uniform heating for the core as it passes therethrough.

A sensing device for the end of the core 50 comprises a collar 75 disposed to slide around the outer surfaces of the rods 61 and carrying a pair of inner rollers 76 which are in parallel spaced position and are disposed on opposite sides of the end rods 61 for guiding the collar as it rises and falls with the core. The rollers 76 rest on the top surface of the core and the crimped yarn 77 is extracted therebetween by delivery rolls or by a winder not shown. A pivoted bracket 78 includes arms 79 pivoted to the two sides of the collar 75 on opposite sides of the cage. The pivoted bracket 78 carries an arm 80 engaging a pin 81 extending from a sprocket 82 on a shaft 83 carrying a chain 84. The chain 84 engages a sprocket 85 carried on a shaft 86 of a potentiometer 87 which is adapted to vary the speed of a motor driving the feed rolls or a winder or other takeup device in a sense to vary the rate of feed or extraction of the crimped yarn so as to maintain the end of the core at a substantially constant level.

Referring to the embodiment of FIGS. 9 to 12, the feed rolls, nosepiece, and heating and cooling cages are similar to those above described and have been given the same reference characters with the suffix "a." The heater housing is split and comprises a front part 90 and a rear part 91 which are hinged together and may be opened to provide access to the heating cage for cleaning. The collars 43a, 44a, and 45a fit within the bore of the housing and are secured therein by the housing walls when the parts are closed.

In this embodiment, means is provided for the admission of steam into the heating chamber in the space around the core of crimped yarn in the heating cage. For this purpose, a horizontal bore 92 is formed in each of the parts 90 and 91 to receive steam from an external source and to supply the same to horizontal slits 93 which extend through the walls of the housing parts at a point above the lower collar 45a. The steam, thus, envelops the core in the heating cage and permeates the crimped yarn. The lower collar 45a closes the space between the walls and the core to prevent condensate from dripping onto the feed rolls. Any such condensate is absorbed by the core and passes upwardly therewith.

In order to minimize such condensation, heating rods 94 may be disposed in bores in the housing walls below and adjacent the inlet slits 93. Vertical grooves 95 are milled in the end walls of the housing, extending upwardly past the center collar 44a and the upper collar 43a so as to allow the steam to contact the core in the space between the upper and lower collars and to escape into the atmosphere past the upper collar 43a.

The housing walls are heated by suitable means such as strip heaters 96 which may be temperature controlled by any suitable means. The parts 90 and 91 of the housing are formed with groove 97 and rib 98 which mesh for sealing the heating chamber against escape of steam.

Steam is supplied from an external source at, for example, pressure of 10 pounds to 250 pounds per square inch and at temperatures of from 240° F. to 410°F. depending upon the pressure. The chamber is maintained by the strip heaters at a temperature which is usually somewhat above the steam temperature, for example, at a temperature of from 250°F. to 450°F. The chamber temperature will depend upon the nature of the yarn and the rate at which the core passes through the chamber. The temperature must, of course, be below that at which degradation occurs. When the steam enters the heating chamber its pressure is reduced to substantially atmospheric pressure due to the fact that the chamber is vented to the atmosphere. Hence, the steam becomes super heated or dry steam as it contacts the core. Should any condensation occur due to contact with the relatively cool core the condensate is revaporized by the heat supplied by the rods 94 and also due to the high temperature maintained in the chamber by the strip heaters 96.

The yarn is thus subjected to an atmosphere of steam in the heating chamber which is adapted to provide optimum setting conditions. As the yarn reaches the cooling zone the steam is immediately dissipated leaving the yarn in a dry state which is suitable for winding onto a package.

In this embodiment, the choke member is shown as comprising a pair of choke elements 100 (FIGS. 9 and 10) journaled in the walls of the crimping chamber 10a. These choke elements 100 are formed with straight surfaces 101 which are offset from their centers and extend upwardly from such center with top edges 102 which are adapted to be displaced inwardly toward the center of the chamber as the choke elements are turned. In their retracted state, the straight surfaces 101 are disposed in recesses in the walls of the chamber 10a and are substantially coplanar therewith. The choke elements 100 are geared together by spur gears 103 are are yieldably biased toward the center of the chamber by a cord 104 and a weight 105.

Figure 9:
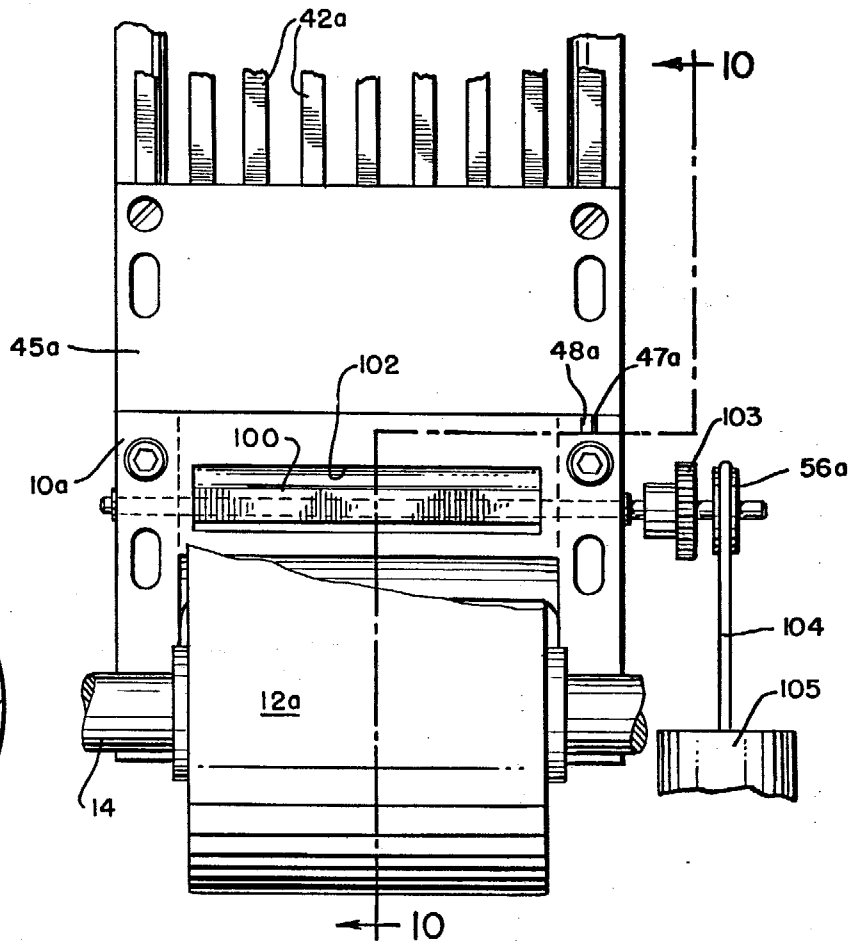
FIG. 9 is a partial elevation similar to FIG. 2 illustrating a choke device of the apparatus of FIGS. 11 and 12.
Figure 10:
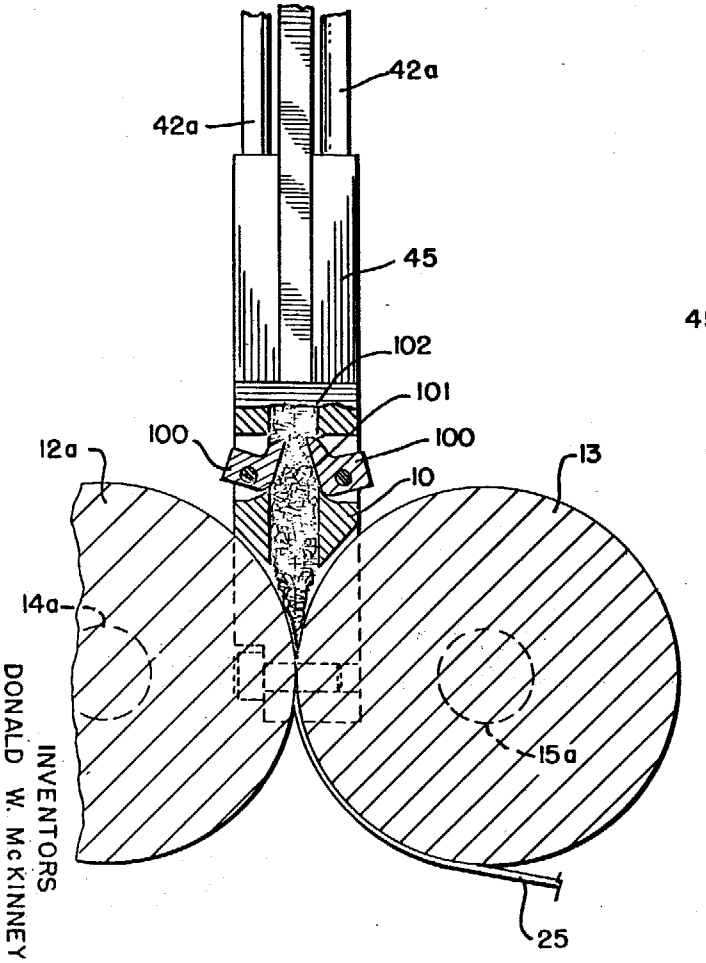
FIG. 10 is a section taken along line 10—10 of FIG. 9.
Figure 11:
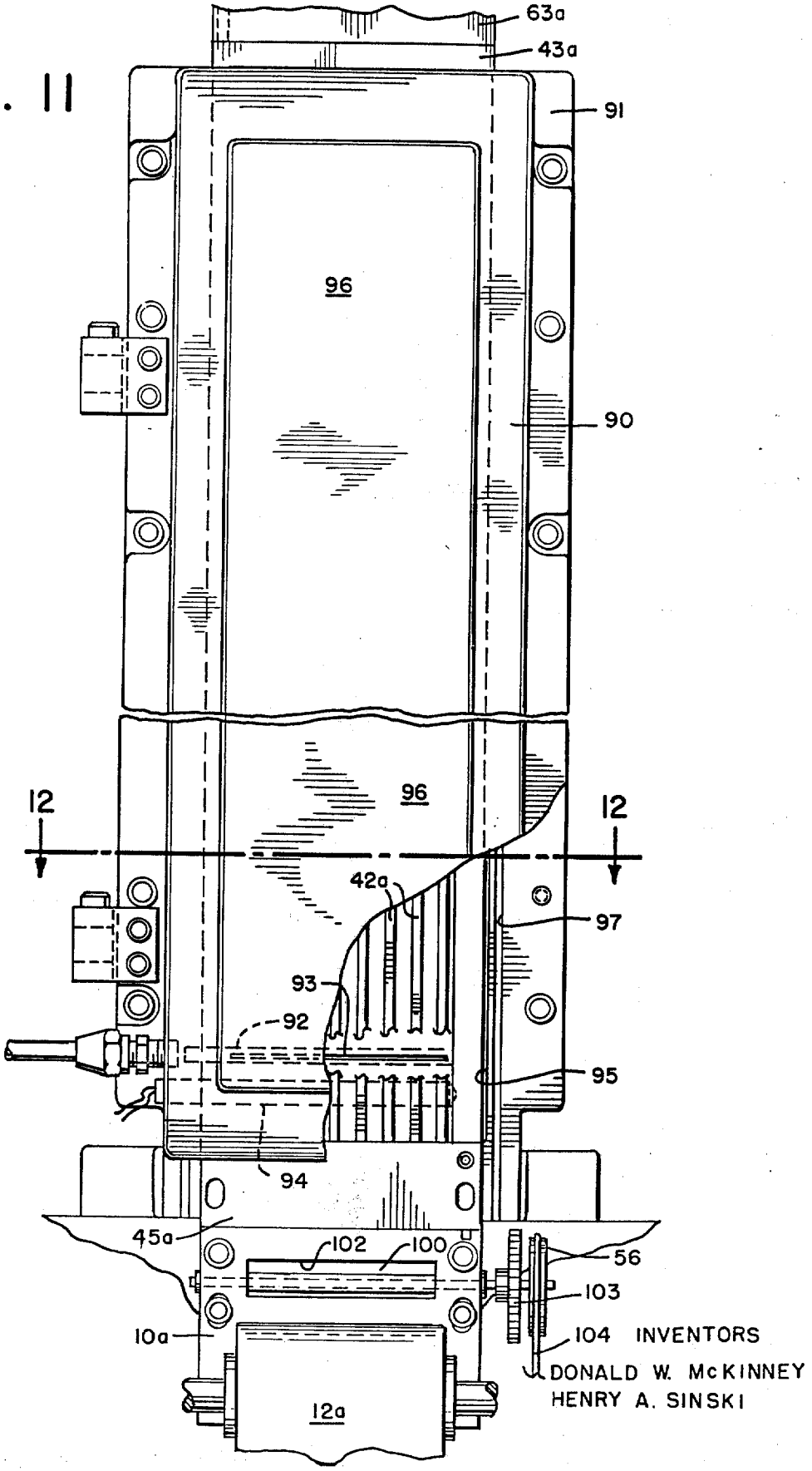
FIG. 11 is a front elevation of a crimping apparatus with parts broken away illustrating a further embodiment of the invention.

The embodiment of FIGS. 9 and 10 has the advantage that the choke is affected at a point in the crimping chamber near the bit of the feed rolls whereas the choke of FIGS. 1 to 8 is affected within the zone of the heating chamber. Such choke members may be substituted in the embodiments of FIGS. 1 to 8, if desired. The arrangement selected will depend upon the characteristics of the yarn and the dimensions of the various parts. In any event, the comparatively small area of contact between the sides of the core with rods forming the heating and cooling cages produces a minimum of friction on the core and the back pressure can be controlled by the arrangement of the chokes and by the pressure exerted thereby on the sides of the core as it advances. The sensing member shown conforms to the average position of the top surface of the core and also forms a guide for the yarn which is extracted therefrom.

Figure 13:
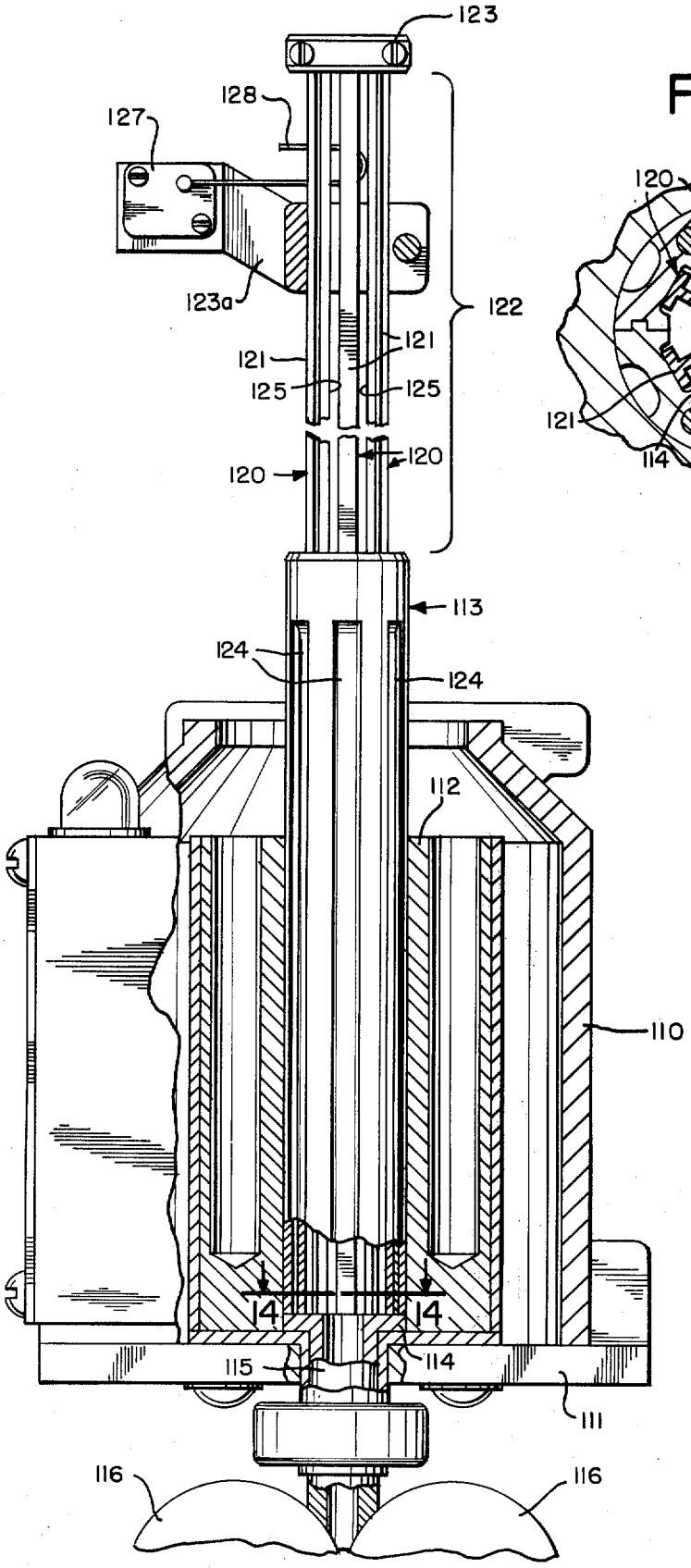
FIG. 13 is a side elevation, with parts in section, illustrating a modified form of crimping chamber.
Figure 14:
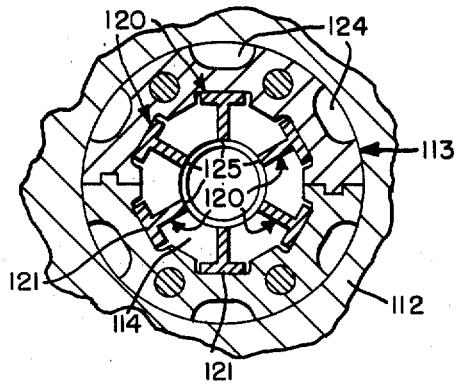
FIG. 14 is a section taken on the line 14—14 of FIG. 13.

Referring to the form of FIGS. 13 and 14 the crimping apparatus is shown as comprising an outer housing

110 supported by suitable means, not shown, having a central bore terminating in a bottom lip 111. A heater ring 112 is seated in said bore against the bottom flange 111 and is formed with a series of peripherally spaced holes adapted to receive heating elements not shown for heating the crimping chamber.

The crimping chamber 113 is composed of a split cylindrical element seated within the heater member 112 and having a bottom member 114 terminating in a central nosepiece 115 which is adapted to receive yarn for crimping from a pair of feed rolls 116 as in the embodiment of FIGS. 1 to 12.

A plurality of ribs 120, shown in the form of T-bars are spaced around the periphery of the chamber 113 with their crossheads 121 disposed in slots in the inner surface of the chamber wall. These [ rods ] *bars* 120 may be secured to the bottom wall 114 by suitable means as by soldering and extend upwardly above the top of the chamber 113 to form a cooling zone 122. The [ rods ] *bars* are secured at their top ends to a ring 123 for rigidity.

Vertical grooves 124 are shown as formed in the outer surface of the chamber 113 opposite the [ ribs ] *bars* 120 to provide air pockets for controlling the heat transfer from the heater ring to the chamber walls and thence to the [ ribs ] *bars.*

The inner edges 125 of the ribs 120 form a support for the core of crimped yarn as it advances along the crimping and heating chamber and along the cooling cage above such chamber where the crimp is set in the yarn. Since the [ ribs ] *bars* 120 contact the core of yarn only at spaced points the friction which opposes the advance of the core is reduced to a minimum.

A switch 127 may be mounted on a bracket 123a and actuated by a feeler wire 128 which extends between the bars 120 to rest upon the top of the core in the cooling zone. This switch 127 is connected to control the feed motor or the winder motor for maintaining the core at a constant level as described above in connection with FIGS. 1 to 12. While only so much of the apparatus is shown in FIGS. 13 and 14 as is necessary for an understanding of the invention, it is to be understood that the remainder of the apparatus in this embodiment is similar to that above described.

I claim:

1. Yarn crimping apparatus comprising walls forming a confined crimping chamber, feed rolls disposed to feed yarn for crimping into one end of said chamber, a housing forming a heating and setting chamber registering with said crimping chamber, a cage having a set of spaced parallel rods disposed around the periphery of said heating chamber with their inner surfaces forming a continuation of the walls of said crimping chamber and extending throughout the length of said heating chamber for confining and guiding the core of crimped yarn therethrough, means securing said rods as a unit to form said cage.

2. Yarn crimping apparatus as set forth in claim 1 in which said cage and said crimping chamber have aligning means for positioning and securing said cage in place.

3. Apparatus as set forth in claim 1 in which said cage includes spacing members for spacing the outer surfaces of said rods from said housing so that circulation of air within said housing and around said cage is facilitated.

4. Yarn crimping apparatus as set forth in claim 1 in which said rods are secured in collars having outer surfaces fitting in said housing for the removal of said cage.

5. Yarn crimping apparatus as set forth in claim 1 in which a cooling cage is disposed in registration with said heater cage, said cooling cage comprising a set of rods registering with said first rods and securing means for holding said last rods in spaced parallel positions for receiving said core of crimped yarn and guiding said core to a discharge point.

6. Yarn crimping apparatus as set forth in claim 5 in which said heater cage and said cooling cage are provided with aligning and securing means for holding said cooling cage in position on said heater cage.

7. Yarn crimping apparatus as set forth in claim 5 in which yarn sensing means is disposed in said cooling cage, said sensing means comprising a collar adapted to extend around said rods, and having a pair of spaced rollers extending between opposite ends of said collar to rest upon the top of said core, a pivoted member having elements pivotally secured to opposite sides of said collar centrally of its ends, and means actuated by said pivoted arm to vary the relative rates of feed and withdrawal of said yarn in a sense to maintain said core at a substantially constant level in said cooling cage.

8. Apparatus as set forth in claim 7 in which a potentiometer is connected to control said relative rates and said pivoted arm is connected to vary said potentiometer as the level of said core rises and falls in said cage.

9. Yarn crimping apparatus as set forth in claim 1 in which means is provided for introducing a heating fluid into said housing into contact with said core.

10. A stuffer crimper as set forth in claim 1 in which said housing has walls enclosing said heating chamber, said housing having an outlet opening for the supply of steam into said chamber in the space between said walls and said core, and having means venting said steam to the atmosphere for thereby maintaining said steam under low pressure while in said chamber.

11. A stuffer crimper as set forth in claim 10 in which a steam inlet opening is disposed in said walls and heating means is disposed adjacent said opening to prevent condensation of steam as it enters said chamber.

12. A stuffer crimper as set forth in claim 10 in which said rods are secured in upper and lower collars, fitting within said walls and said steam inlet is disposed above said lower collar.

13. A stuffer crimper as set forth in claim 12 in which vertical passages are formed in said walls and extend past said upper collar to provide a passage for steam to the atmosphere.

14. A stuffer crimper as set forth in claim 12 in which said lower collar closes the space between said walls and said core to prevent condensate from dripping onto said feed rolls.

15. A stuffer crimper as set forth in claim 10 in which heating means is provided to heat said yarn to a temperature sufficient to superheat said steam.

16. Crimping apparatus as set forth in claim 1 including a traversing guide adapted to traverse the yarn as it is fed to said feed rolls and displaced from said feed rolls to cause the yarn to engage one of said rolls at a tangent and to extend around at least 45° of the periphery of said roll as it is fed to said bite.

17. Crimping apparatus as set forth in claim 1 in which said rods are in the form of members having radially extending flanges disposed around said chamber with their inner edges spaced to contact and confine said core.

18. Crimping apparatus as set forth in claim 17 in which said flanges are formed with peripheral heads disposed in contact with the walls of said chamber and secured thereto.

19. Crimping apparatus as set forth in claim 18 in which said walls are grooved to receive said heads.

20. Crimping apparatus as set forth in claim 19 in which a heating member surrounds said chamber and the chamber walls are formed with grooves in their outer surface registering with said inner grooves to provide air space for controlling the heat transfer.

21. The method of treating yarn in a stuffer crimper having a crimping chamber through which a compacted core of crimped yarn is passed which comprises maintaining said chamber at substantially atmospheric pressure and introducing steam into said chamber at an elevated temperature and [ means ] *pressure* adapted to cause the steam to become superheated in a dry state when its pressure is reduced to atmospheric in said chamber, [ and ] contacting said *core with said* dry superheated steam [ with said core for heating the same ], *and heating said chamber to such an extent as to maintain said superheated steam in the superheated state while in said chamber.*

22. The method set forth in claim 21 in which said chamber is maintained at a temperature above the steam temperature.

23. Yarn crimping apparatus comprising a confined crimping chamber, feed rolls, disposed to feed yarn for crimping into one end of said chamber to be folded over and crimped against a core of previously crimped yarn in said chamber, a pair of shafts disposed on opposite sides of said core adjacent the lower end of said chamber, yieldable choke members carried by said shafts and disposed to contact the opposite sides of said core, said members having surfaces adapted to register with the chamber walls when in retracted position and being adapted to engage and compact said core when advanced, and means biasing said members into compressive contact with said core for controlling the back pressure of the core in said crimping chamber.

24. Crimping apparatus as set forth in claim 23 in which said choke members form a part of the chamber wall when fully retracted.

25. Yarn crimping apparatus as set forth in claim 23 in which said shafts are connected to turn in unison and weighted means is provided to yieldably bias said shafts in a direction to bring said members into choking engagement with said core.

26. Apparatus as set forth in claim 23 in which said choke members comprise plates disposed on opposite sides of said core and yieldably are held in contact with said core.

*27. Apparatus as set forth in claim 1 further comprising choke means positioned to engage said core at a point near the feed roll end thereof for retarding the advance of said core and for controlling the back pressure at the input end of the core.*

*28. Apparatus as set forth in claim 27 further comprising control means operatively connected to said choke means to vary the back pressure on said crimping chamber.*

* * * * *